US007519593B2

(12) United States Patent
Abe et al.

(10) Patent No.: US 7,519,593 B2
(45) Date of Patent: Apr. 14, 2009

(54) DATA SEARCHING SYSTEM, METHOD OF SYNCHRONIZING METADATA AND DATA SEARCHING APPARATUS

(75) Inventors: Kazuko Abe, Fuchu (JP); Junichi Yamamoto, Fuchu (JP); Rei Yano, Fuchu (JP); Masataka Yamada, Fuchu (JP); Yasuhide Kurosaki, Fuchu (JP); Michiyo Ikegami, Nakano (JP); Kyoji Yamashita, Nishitokyo (JP); Kouji Gouda, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 256 days.

(21) Appl. No.: 11/553,711

(22) Filed: Oct. 27, 2006

(65) Prior Publication Data

US 2007/0100807 A1 May 3, 2007

(30) Foreign Application Priority Data

Oct. 31, 2005 (JP) ............................. 2005-317475

(51) Int. Cl.
*G06F 7/00* (2006.01)
*G06F 17/30* (2006.01)
*G06F 12/00* (2006.01)

(52) U.S. Cl. ............................... 707/6; 707/3; 707/203

(58) Field of Classification Search ................. 707/100, 707/102, 202–204, 1–4, 6, 10, 200; 709/203, 709/217, 229
See application file for complete search history.

(56) References Cited

U.S. PATENT DOCUMENTS

| 5,761,678 | A  | * | 6/1998 | Bendert et al. ............... 707/204 |
| 6,151,624 | A  | * | 11/2000 | Teare et al. .................. 709/217 |
| 6,732,124 | B1 | * | 5/2004 | Koseki et al. ............... 707/202 |
| 7,228,352 | B1 | * | 6/2007 | Yaguchi et al. ............. 709/229 |
| 2002/0059215 | A1 |   | 5/2002 | Kotani et al. |
| 2006/0167868 | A1 | * | 7/2006 | Zhang et al. .................... 707/4 |
| 2006/0190500 | A1 | * | 8/2006 | Rao et al. .................... 707/203 |
| 2006/0259527 | A1 | * | 11/2006 | Devarakonda et al. ...... 707/203 |
| 2007/0036444 | A1 | * | 2/2007 | Yoshida |

FOREIGN PATENT DOCUMENTS

JP 2002-202975 7/2002

* cited by examiner

*Primary Examiner*—Don Wong
*Assistant Examiner*—Merilyn P Nguyen
(74) *Attorney, Agent, or Firm*—Oblon, Spivak, McClelland, Maier & Neustadt, P.C.

(57) ABSTRACT

A data searching unit 12 of a data searching apparatus 10 Obtains, according to a searching request including a search condition specified by a data searching application 16, metadata which satisfy the search condition from a data storage unit 11, and instructs an external communication unit 15 to request searching of data to a data providing apparatus 20 with the same search condition.

13 Claims, 7 Drawing Sheets

DATA SEARCHING SYSTEM, METHOD OF SYNCHRONIZING METADATA AND DATA SEARCHING APPARATUS

CROSS-REFERENCE TO THE INVENTION

This application is based upon and claims the benefit of priority from the prior Japanese Patent Application No. 2005-317475, filed on Oct. 31, 2005; the entire contents of which are incorporated herein by reference.

BACKGROUND OF THE INVENTION

1. Field of the Invention

The present invention relates to a technology for searching actual data as a searching target using metadata related to the actual data, and in particular relates to a data searching system constituted of a data searching apparatus which searches metadata based on a search condition specified by the user and a data providing apparatus which searches actual data and metadata according to a searching request generated based on the metadata searched by the data searching apparatus and provides a search result to the data searching apparatus, a method of synchronizing metadata and a data searching apparatus.

2. Description of the Related Art

Metadata are data about actual data, an example of which is one described by defined items such as location, contents, keyword, language, and data format of the actual data.

Using metadata, it becomes possible to efficiently search target data from piles of vast amounts of data disclosed on web sites for example, and it is largely expected to be used for searching of data which are difficult to be searched by keywords, such as pictures in particular.

As a publicly known technology related to the data searching apparatus using metadata, there is Patent document 1 for example.

[Patent Document 1] JP-A 2002-202975

SUMMARY OF THE INVENTION

As a mechanism of searching data using metadata, there is a combined system of a data searching apparatus which stores metadata and searches metadata based on a search condition specified by the user and a data providing apparatus which stores actual data and metadata for the actual data, searches actual data and metadata according to a data searching request generated based on metadata searched by the data searching apparatus, and provides a search result to the data searching apparatus.

In such a system, the metadata owned by the data providing apparatus are updated frequently, and the data searching apparatus owns copied metadata of the metadata (metadata master) owned by the data providing apparatus at a certain time point.

Therefore, in order for the data searching apparatus to obtain a fresher data search result, it is necessary to collect metadata frequently from the data providing apparatus to reflect updating of the metadata master to the metadata owned by the data searching apparatus, namely, synchronize the metadata.

Regarding collection of metadata by the data searching apparatus, an OAI-PMH (Open Archives Initiative Protocol for Metadata Harvesting) protocol established by OAI (Open Archives Initiative) is widely known.

The OAI-PMH defines an interoperable protocol for collecting metadata from each other among electronic libraries connected over a network.

The OAI-PMH defines about selective data collection specifying a concept, a format and a date of data to be exchanged.

However, the OAI-PMH is merely defining a protocol for data collection, and does not define anything about methods of synchronizing metadata.

For example, it is considered about a system including an electronic library A retaining metadata master and operating as a data providing apparatus and an electronic library B retaining a copy of the metadata master and operates as a data searching apparatus.

Here, it is supposed that part of the metadata master retained by the electronic library A is deleted.

However, synchronization of metadata in the electronic library B is performed periodically such as once a week, once a day, once every several hours for example.

Therefore, for the updating of the metadata master retained by the electronic library A to be reflected on the metadata retained by the electronic library B, there occurs a delay in time on the order of several hours, several tens of minutes for example, which causes a problem of lowering freshness of data search results particularly in a situation where the frequency of updating the metadata is high.

In view of such a situation, the present invention intends to provide a data searching system, a method of synchronizing metadata and a data searching apparatus capable of constantly obtaining a highly fresh data search result.

A data searching system according to an embodiment of the present invention includes a data providing apparatus having a first data storage unit which stores actual data as a searching target and metadata related to the actual data, performing searching of data from the first data storage unit according to a data searching request, and providing a data search result to a requester, and a data searching apparatus, in which the data searching apparatus includes a second data storage unit which stores a copied metadata copied from the metadata stored in the first data storage unit, a data searching unit which searches the copied metadata from the second data storage unit based on a given search condition, and transmits the data searching request to the data providing apparatus based on the searched copied metadata, and a data matching unit which judges matching of the data search result provided from the data providing apparatus with the copied metadata searched from the second data storage unit, and when non-matching is judged, updates the copied metadata in the second data storage unit with the data search result provided from the data providing apparatus.

A method of synchronizing metadata according to an embodiment of the present invention by a data searching system which includes a data providing apparatus having a first data storage unit which stores actual data as a searching target and metadata related to the actual data, performing searching of data from the first data storage unit according to a data searching request, and providing a data search result to a requester, and a data searching apparatus having a second data storage unit which stores a copied metadata of the metadata stored in the first data storage unit, the method including searching, by the data searching apparatus, the copied metadata from the second data storage unit based on a given search condition, and transmitting the data searching request to the data providing apparatus based on the searched copied metadata, and judging, by the data searching apparatus, matching of the data search result provided from the data providing apparatus with the copied metadata searched from the second data storage unit, and when non-matching is judged, updating the copied metadata in the second data storage unit with the data search result provided from the data providing apparatus.

A data searching apparatus according to an embodiment of the present invention connectable to a data providing apparatus having a first data storage unit which stores actual data as a searching target and metadata related to the actual data, performing searching of data from the first data storage unit according to a data searching request, and providing a data search result to a requester, the data searching apparatus including a second data storage unit which stores a copied metadata copied from the metadata stored in the first data storage unit, a data searching unit which searches the copied metadata from the second data storage unit based on a given search condition, and transmits the data searching request to the data providing apparatus based on the searched copied metadata, and a data matching unit which judges matching of the data search result provided from the data providing apparatus with the copied metadata searched from the second data storage unit, and when non-matching is judged, updates the copied metadata in the second data storage unit with the data search result provided from the data providing apparatus.

Specifically, by reflecting update contents of metadata master on metadata in the data searching apparatus as triggered by searching of data, a highly fresh data search result can be obtained constantly.

DETAILED DESCRIPTION

Hereinafter, embodiments of the present invention will be explained based on the drawings.

The embodiments of the present invention are described with reference to the drawings, but the drawings are provided solely for illustrative purpose, and by any means do not limit the invention.

First Embodiment

Figure 1:
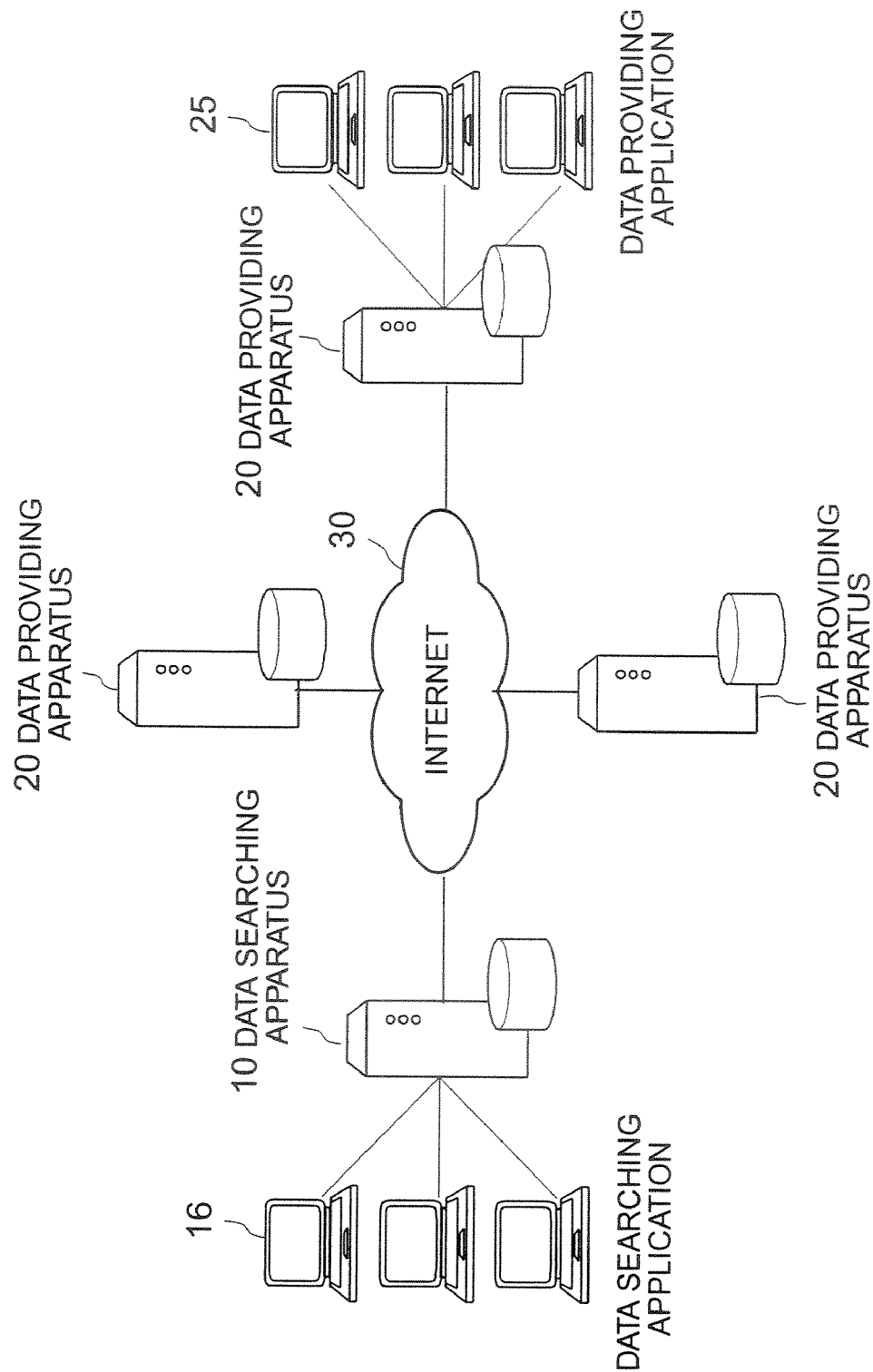
FIG. 1 is a view showing an overall configuration of a data searching system according to a first embodiment of the present invention

FIG. 1 is a view showing an overall configuration of a data searching system according to a first embodiment of the present invention.

The data searching system according to this embodiment is realized for example by a plurality of computers each constituted of a CPU (Central Processing Unit) executing a program, a ROM (Read Only Memory), a RAM (Random Access Memory) as a main memory storing a program being executed and data, a storage device such as a hard disk drive which stores programs and data, an input device such as a keyboard and a mouse, and a display device, or by a network system of server/client type configured by organically connecting a plurality of such computers via a communication line.

Hereinafter, terms such as "unit" and "module" in control unit, control module, and the like mean a function realized by the CPU executing a specific part of a program.

Further, a "data storage unit" below is constituted using the RAM and the storage device in the configuration of the above computer.

This data searching system 100 is constituted of a data searching apparatus 10 and one or more data providing apparatuses 20.

The data searching apparatus 10 and the one or more data providing apparatuses 20 are connected with each other via a transmission medium 30 such as the internet The data searching apparatus 10 has a data storage unit which stores metadata related to actual data.

The data searching apparatus 10 searches metadata from the data storage unit upon reception of a search condition from a data searching application 16 operated by a data searcher.

Further, the data searching apparatus 10 transmits a data searching request to the data providing apparatus 20 based on the searched metadata.

The data providing apparatus 20 has a data storage unit which stores actual data and metadata related thereto.

Metadata owned by the data providing apparatus 20 is described as "metadata master" below.

The data providing apparatus 20 searches actual data and metadata from the data storage unit in response to the data searching request from the data searching apparatus 10, and provides a data search result thereof to the data searching apparatus 10 via the transmission medium 30

The data searching apparatus 10 returns the data search result provided by the data providing apparatus 20 to the data searching application 16.

Further, the data providing apparatus 20 updates the metadata master upon reception of a request of updating such as newly adding, updating (version up), deleting or the like of metadata from a data providing application 25 operated by a data provider.

The data searching apparatus 10 stores a copy of the metadata master at a certain time in the data storage unit.

The metadata master or update contents thereof are transmitted to the data searching apparatus 10 via the transmission medium 30 and reflected on the metadata owned by the data searching apparatus 10.

Thus, synchronization processing of metadata is performed between the data searching apparatus 10 and the data providing apparatus 20.

Figure 2:
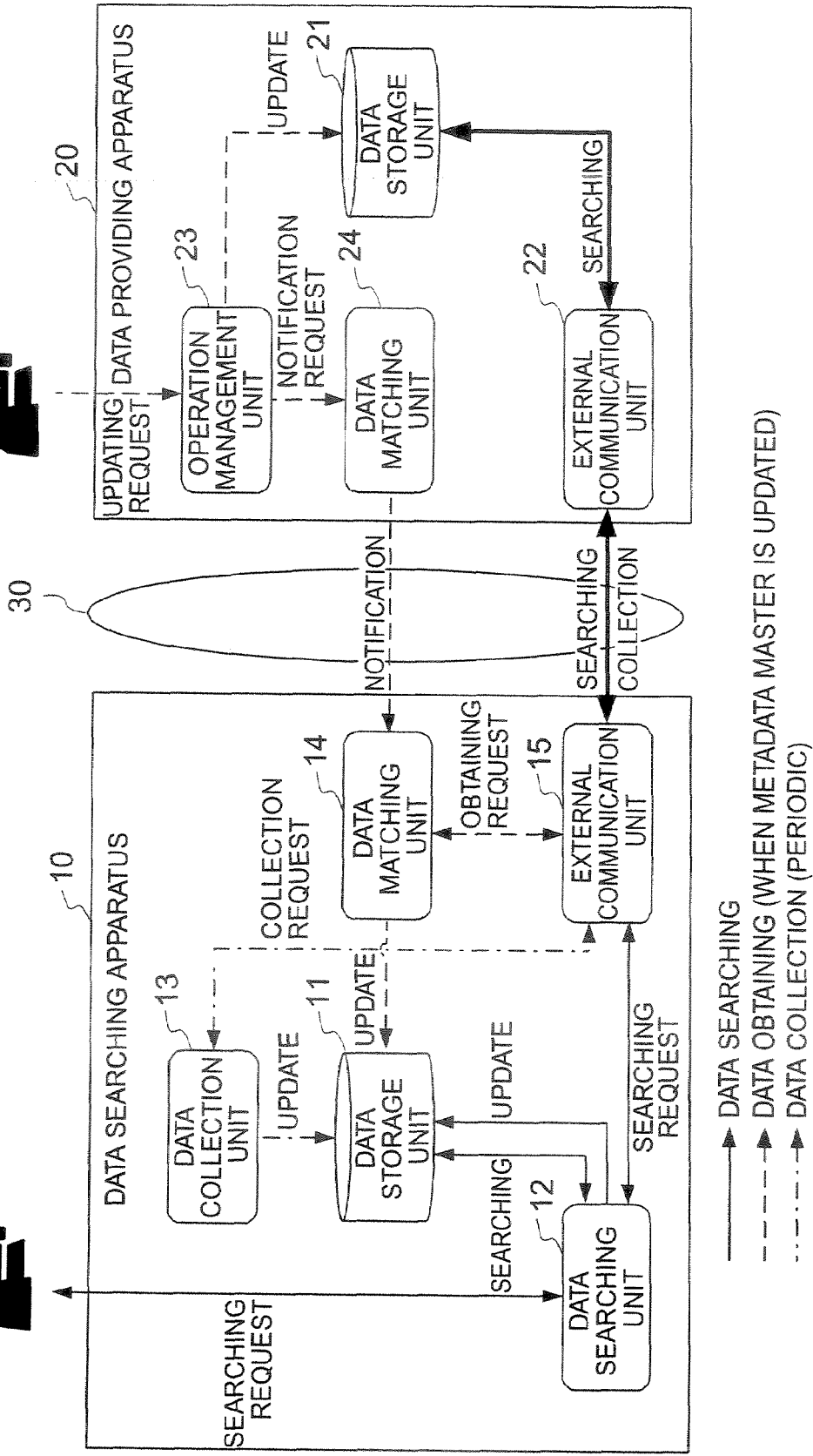
FIG. 2 is a view showing a detailed configuration of the data searching system of FIG. 1.

FIG. 2 is a view showing a more detailed configuration of the data searching system 100 of FIG. 1.

As shown in this view, the data searching apparatus 10 has a data storage unit 11, a data searching unit 12, a data collection unit 13, a data matching unit 14 and an external communication unit 15.

The data storage unit 11 corresponds to a second data storage unit in the configuration according to the present invention, and stores copied metadata which are the copy of the metadata master at a certain time owned by the data providing apparatus 20.

According to a searching request including a search condition specified by the data searching application 16, the data searching unit 12 obtains metadata that satisfies the search condition from the data storage unit 11, and instructs the external communication unit 15 based on this metadata to request searching of data to the data providing apparatus 20.

The data searching unit 12 compares data (actual data, metadata) responded as a data search result from the data providing apparatus 20 with the metadata obtained from the data storage unit 11 and checks matching of data with each other.

When the data searching unit 12 judges that the metadata obtained from the data providing apparatus 20 is mismatched due to an update by new adding, updating (version up), deleting, or the like for example, it updates existing metadata (copied metadata having the same identifier as the metadata obtained from the data providing apparatus 20) in the data storage unit 11 with the metadata obtained from the data providing apparatus 20=

Note that in the data searching unit 12, the format of a search result obtained from the data providing apparatus 20 is specified by the data searching application 16.

Here, as the format of a search result which can be specified, there are:

(1) metadata
(2) actual data
(3) metadata+actual data.

When searching of data is requested to the data providing apparatus 20 with actual data being specified as the format of a search result, the data searching unit 12 compares the actual data obtained from the data providing apparatus 20 with the metadata in the data storage unit 11 based on information such as updated date and time of the both to judge whether the metadata master is updated or not.

When the data searching unit 12 judges that the metadata master is updated, it can instruct the external communication unit 15 to send a metadata obtaining request including the ID of the actual data to the data providing apparatus 20 to thereby obtain desired metadata from the data providing apparatus 20.

Specifically, the data searching unit 12 and the external communication unit 15 function as a request unit which transmits, upon reception of a metadata master update notice from the data providing apparatus 20, an obtaining request of updated metadata in a data storage unit 21 to the data providing apparatus 20.

The metadata and the actual data ID are correlated one-to-one or one-to-many, so that the data providing apparatus 20 can search corresponding metadata from the metadata master based on the actual data ID and return the metadata to the data searching apparatus 10

The data collection unit 13 instructs collection of metadata master to the external communication unit 15 in order to periodically collect metadata copied from the metadata master (referred to as copied metadata below)

The data collection unit 13 obtains copied data of the metadata master collected from the data providing apparatus 20 by the external communication unit 15 by the instruction of collection.

Here, "periodically" means a preset period such as once a week, once a day, once every several hours, and so forth for example.

The "collection of metadata master" refers to obtainment of part or the whole of the metadata owned by the data providing apparatus 20.

The data matching unit 14 receives a metadata master update notice (metadata MUN for short) transmitted from the data providing apparatus 20 transmitted from the data providing apparatus 20 as triggered by updating of the metadata master.

Upon reception of the metadata master update notice, the data matching unit 14 instructs the external communication unit 15 to send a metadata obtaining request to the data providing apparatus 20.

The data matching unit 14 updates existing metadata in the data storage unit 11 with metadata obtained from the data providing apparatus 20 by the external communication unit 15 by the metadata obtaining request.

According to a request from the data searching unit 12, the data collection unit 13 or the data matching unit 14, the external communication unit 15 transmits to the data providing apparatus 20 via the transmission medium 30 a message of various requests to the data providing apparatus 20, and returns to the requesting module a response message from the data providing apparatus 20.

In other words, the data matching unit 14 and the external communication unit 15 function as an updating unit which updates the copied metadata in the data storage unit 11 with the updated metadata provided from the data providing apparatus 20 by the metadata obtaining request.

The data providing apparatus 20 has a data storage unit 21, an external communication unit 22, an operation management unit 23, and a data matching unit 24.

The data storage unit 21 corresponds to a first data storage unit in the configuration according to the present invention.

The data storage unit 21 stores actual data and metadata (metadata master) related to the actual data.

The external communication unit 22 receives a data searching request message (data SRM for short) from the data searching apparatus 10 via the transmission medium 30.

The external communication unit 22 performs searching of data on the data (actual data and metadata) stored in the data storage unit 21 based on the received data searching request message (data SRM), and transmits a response message including a data search result to the data searching apparatus 10 via the transmission medium 30.

Further, the external communication unit 22 receives via the transmission medium 30 a metadata obtaining request message (metadata ORM for short) including an actual data ID from the data searching apparatus 10.

Further, the external communication unit 22 searches relevant metadata from the data storage unit 21 based on the actual data ID included in the received metadata ORM and transmits the relevant metadata to the data searching apparatus 10 via the transmission medium 30.

Further, the external communication unit 22 receives a metadata collection request message (metadata CRM for short) from the data searching apparatus 10 via the transmission medium 30.

Upon reception of the metadata collection request message (metadata CRM), the external communication unit 22 transmits a response message including copied metadata of the metadata master in the data storage unit 21 to the data searching apparatus 10 via the transmission medium 30.

In other words, the external communication unit 22 functions as a providing unit which provides from the first data storage unit 21 metadata requested from the data searching apparatus 10.

The operation management unit 23 updates at any time the actual data and the metadata master in the data storage unit 21 upon reception of a request of updating such as newly adding, updating (version up), deleting or the like of metadata from the data providing application 25.

The operation management unit 23 instructs the data matching unit 24 to transmit a metadata master update notice (metadata MUN) to the data searching apparatus 10 each time updating of the metadata master occurs.

According to the instruction from the operation management unit 23, the data matching unit 24 transmits the metadata master update notice (metadata MUN) to the data searching apparatus 10 via the transmission medium 30. In other words the operation management unit 23 and the data matching unit 24 function as a notification unit which transmits the metadata master update notice (metadata MUN) to the data searching apparatus 10 as triggered by updating of the metadata in the first data storage unit 21.

Next, an operation of synchronization processing triggered by searching of data in the data searching system 100 of this embodiment is explained.

Figure 3:
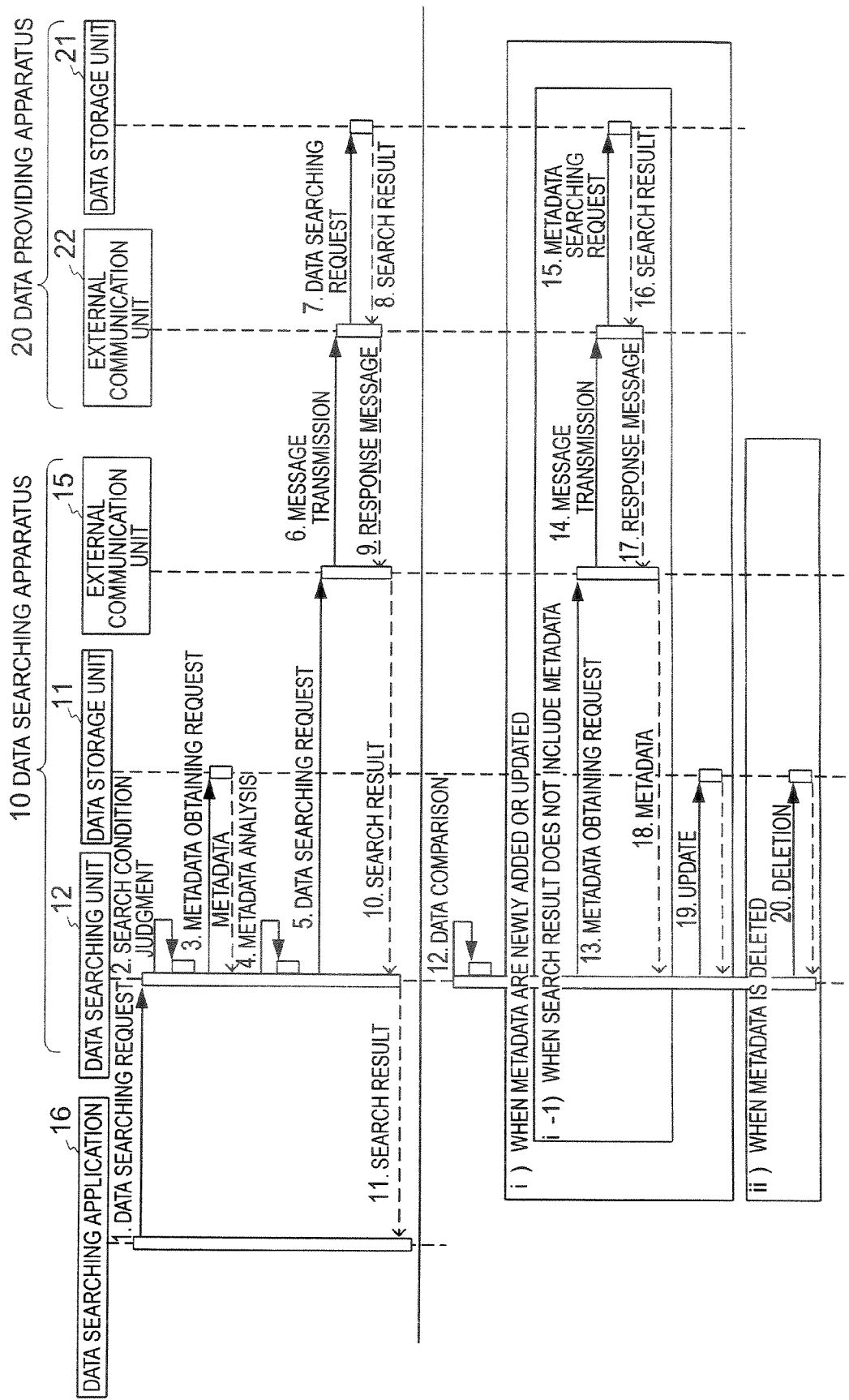
FIG. 3 is a sequence diagram showing the flow of synchronization processing triggered by searching of data.

FIG. 3 is a sequence diagram showing the flow of this synchronization processing triggered by searching of data.

1. (flow #1 in FIG. 3) The data searching application 16 specifies a search condition to transmit a data searching request to the data searching unit 12 of the data searching apparatus 10.

Here, the search condition also includes information indicating whether or not to perform searching of data from the data providing apparatus 20.

2. The data searching unit 12 analyzes the data searching request given by the data searching application 16 to judge the search condition.

3. The data searching unit 12 performs a metadata obtaining request (metadata OR) based on the judged search condition and obtains metadata from the data storage unit 11.

4. The data searching unit 12 analyzes the metadata obtained form the data storage unit 11.

By the analysis of the metadata, the data searching unit 12 judges whether it is necessary to request searching of data to the data providing apparatus 20.

5. As a result of judging the search condition in the judgment processing in 2., when the data searching unit 12 judges that information for performing searching of data from the data providing apparatus 20 is included in the search condition, the data searching unit 12 requests to the external communication unit 15 searching of data in the data providing apparatus 20 based on the analysis result of the metadata obtained from the data storage unit 11.

6. The external communication unit 15 generates a data searching request message (data SRM) according to the request from the data searching unit 12 and transmits the message to the data providing apparatus 20 via the transmission medium 30.

7.-9. The external communication unit 22 of the data providing apparatus 20 analyzes the received data searching request message (data SRM) and performs searching of data in the data storage unit 21 based on an analysis result thereof, generates a response message including a data search result, and returns the response message to the data searching apparatus 10 via the transmission medium 30.

10.-11. The external communication unit 15 of the data searching apparatus 10 receives the response message, and returns the data search result included in this response message to the data searching unit 12 of the data searching apparatus 10, and the data searching unit 12 of the data searching apparatus 10 returns the data search result to the data searching application 16.

12. The data searching unit 12 of the data searching apparatus 10 compares the metadata included in the data search result obtained form the data providing apparatus 20 with the metadata obtained in the metadata obtaining request (metadata OR) of 3. from the data storage unit 11 of the data searching apparatus 10 to judge matching of the both.

Note that when metadata is not included in the data search result, the comparison is performed with the actual data.

This judgment of matching compares, for example, contents and versions of the metadata with each other, and when the contents or versions are different, it judges that the metadata owned by the data providing apparatus 20 are updated.

Also, when the metadata has an identifier that does not exist in the data storage unit 11, it is judged to be newly added metadata.

The metadata has information such as identifier, version number, date and time of updating, and so forth, and it is possible to identify metadata corresponding to each actual data by the identifier.

Further, it is possible to judge a relationship before and after updating between metadata having the same identifier by version numbers, date and time of updating, and so forth.

Furthermore, when neither the metadata nor the actual data could be searched from the data providing apparatus 20, it is possible to judged that the metadata is deleted from the metadata master.

However, this is the case when the format of the search result is specified so that the search result includes metadata.

When the format of the search result is specified so as to search only actual data from the data providing apparatus 20, the data searching unit 12 judges matching the data with each other by for example comparing the date and time of updating of the actual data obtained from the data providing apparatus 20 with the date and time of updating of the metadata obtained from the data storage unit 11 of the data searching apparatus 10.

13. As a result of the judgment of matching, if it is judged that the metadata in the data providing apparatus 20 is newly added or updated and that only the actual data is obtained as the search result from the data providing apparatus 20, the data searching unit 12 of the data searching apparatus 10 instructs the external communication unit 15 to obtain metadata corresponding to the obtained actual data from the data providing apparatus 20.

14. The external communication unit 15 of the data searching apparatus 10 transmits a metadata obtaining request message (metadata ORM) including the ID of the obtained actual data to the data providing apparatus 20 via the transmission medium 30.

15.-18. The external communication unit 22 of the data providing apparatus 20 searches the corresponding metadata from the data storage unit 21 based on the actual data ID included in the received metadata obtaining request message (metadata ORM), and responds a response message including the searched metadata to the data searching unit 12 via the external communication unit 15 of the data searching apparatus 10.

19. As a result of the judgment of matching, if it is judged that the metadata in the data providing apparatus 20 is newly added or updated, and that the metadata is searched from the data providing apparatus 20 and obtained by the data searching unit 12 or the metadata corresponding to the actual data is obtained by processing of 15.-18., the data searching unit 12 updates existing metadata (metadata having the same identifier as the newly added or updated metadata) in the data storage unit 11 with the newly added or updated metadata.

20. As a result of the judgment, when it is judged that the metadata is deleted from the metadata master in the data providing apparatus 20, the data searching unit 12 deletes the metadata in the data storage unit 11 that has the same identifier as the deleted metadata As described above, according to the data searching system 100 of this embodiment, it is possible to reflect updated contents of the metadata master on the metadata in the data searching apparatus as triggered by searching of data, so that a highly fresh data search result can be obtained constantly.

Second Embodiment

Next, a second embodiment of the present invention will be explained.

Figure 4:
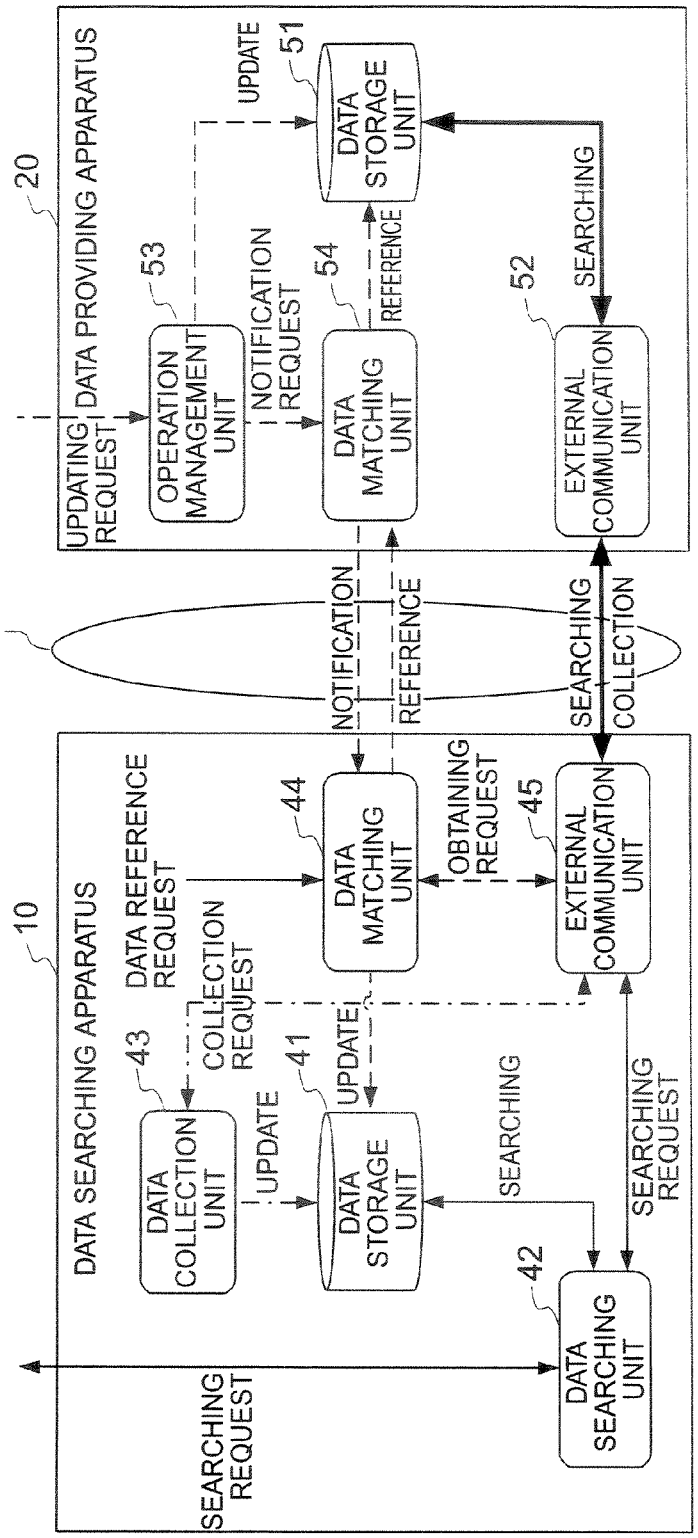
FIG. 4 is a view showing an overall configuration of a data searching system according to a second embodiment of the present invention.

FIG. 4 is a view showing an overall configuration of a data searching system according to the second embodiment of the present invention.

The physical structure of the data searching system 110 of this embodiment is the same as in FIG. 1.

Specifically, the data searching system 110 of this embodiment is constituted of a data searching apparatus 10 and one or more data providing apparatuses 20.

The data searching apparatus 10 and the one or more data providing apparatuses 20 are connected with each other via a transmission medium 30 such as the internet.

The data searching apparatus 10 has a data storage unit 41, a data searching unit 42, a data collection unit 43, a data matching unit 44, and an external communication unit 45.

The data storage unit 41 is a means for storing a copy of metadata master at a certain time owned by the data providing apparatus 20.

According to a searching request including a search condition specified by a data searching application 16, the data searching unit 42 obtains metadata that satisfies the search condition from the data storage unit 41

Then, the data searching unit 42 is a means for instructing the external communication unit 45 based on the obtained metadata to request searching of data to the data providing apparatus 20

Further, this data searching unit 42 may be one having the function of the data searching unit 12 of the first embodiment The data collection unit 43 instructs collection of metadata master to the external communication unit 45 in order to collect copied metadata of the metadata master periodically.

The data collection unit 43 obtains the copied metadata of the metadata master collected from the data providing apparatus 20 by the external communication unit 45 by this instruction Here, "periodically" means a preset period such as once a week, once a day, once every several hours, and so forth.

The "collection of metadata master" refers to obtainment of part or the whole of the metadata owned by the data providing apparatus 20e The data matching unit 44 receives a metadata master update notice (metadata MUN) transmitted from the data providing apparatus 20 as triggered by updating of the metadata master.

Upon reception of the metadata master update notice (metadata MUN), the data matching unit 44 instructs the external communication unit 45 to send a metadata obtaining request (metadata OR) to the data providing apparatus 20.

The data matching unit 44 updates existing metadata in the data storage unit 41 with metadata obtained from the data providing apparatus 20 by the external communication unit 45 in response to the metadata obtaining request (metadata OR).

Further, when the data matching unit 44 receives a data reference request irregularly, for example at arbitrary timing specified by the administrator of the data searching apparatus 10, it requests a data reference to the data providing apparatus 20.

The data matching unit 44 judges (checks) matching of a metadata list that is a data reference result received from the data providing apparatus 20 by the data reference request and the metadata stored in the data storage unit 41.

When it is judged that the metadata in the data providing apparatus 20 is newly added or updated, the data matching unit 44 instructs the external communication unit 45 to obtain the newly added or updated metadata from the data providing apparatus 20.

The data matching unit 44 updates the existing metadata in the data storage unit 41 with the metadata obtained from the data providing apparatus 20 by the external communication unit 45 by this instruction.

According to a request from the data collection unit 43 or the data matching unit 44, the external communication unit 45 transmits to the data providing apparatus 20 via the transmission medium 30 a message of various requests to the data providing apparatus 20.

The external communication unit 45 returns to the requesting module a response message received from the data providing apparatus 20 in response to the message of various requests.

The data providing apparatus 20 has a data storage unit 51, an external communication unit 52, an operation management unit 53, and a data matching unit 54.

The data storage unit 51 is a means for storing actual data and metadata (metadata master) related to the actual data.

Upon reception of a metadata obtaining request message (metadata ORM) from the data searching apparatus 10 via the transmission medium 30, the external communication unit 52 generates a response message including copied metadata of the metadata master stored in the data storage unit 51 and transmits the response message to the data searching apparatus 10 via the transmission medium 30.

The operation management unit 53 updates at any time the actual data and the metadata master in the data storage unit 51 upon reception of a request of updating such as newly adding, updating (version up), deleting or the like of metadata from a data providing application 25.

Further, the operation management unit 53 instructs the data matching unit 54 to transmit a metadata master update notice (metadata MUN) to the data searching apparatus 10 each time updating of the metadata master occurs According to the instruction from the operation management unit 53, the data matching unit 54 transmits the metadata master update notice (metadata MUN) to the data searching apparatus 10 via the transmission medium 30.

Further, upon reception of the data reference request from the data matching unit 44 of the data searching apparatus 10, the data matching unit 54 performs a data reference to the data storage unit 51, extracts relevant metadata, and responds a metadata list to the data matching unit 44 of the data searching apparatus 10.

Next, the operation of the data searching system 110 of this embodiment is explained.

Figure 5:
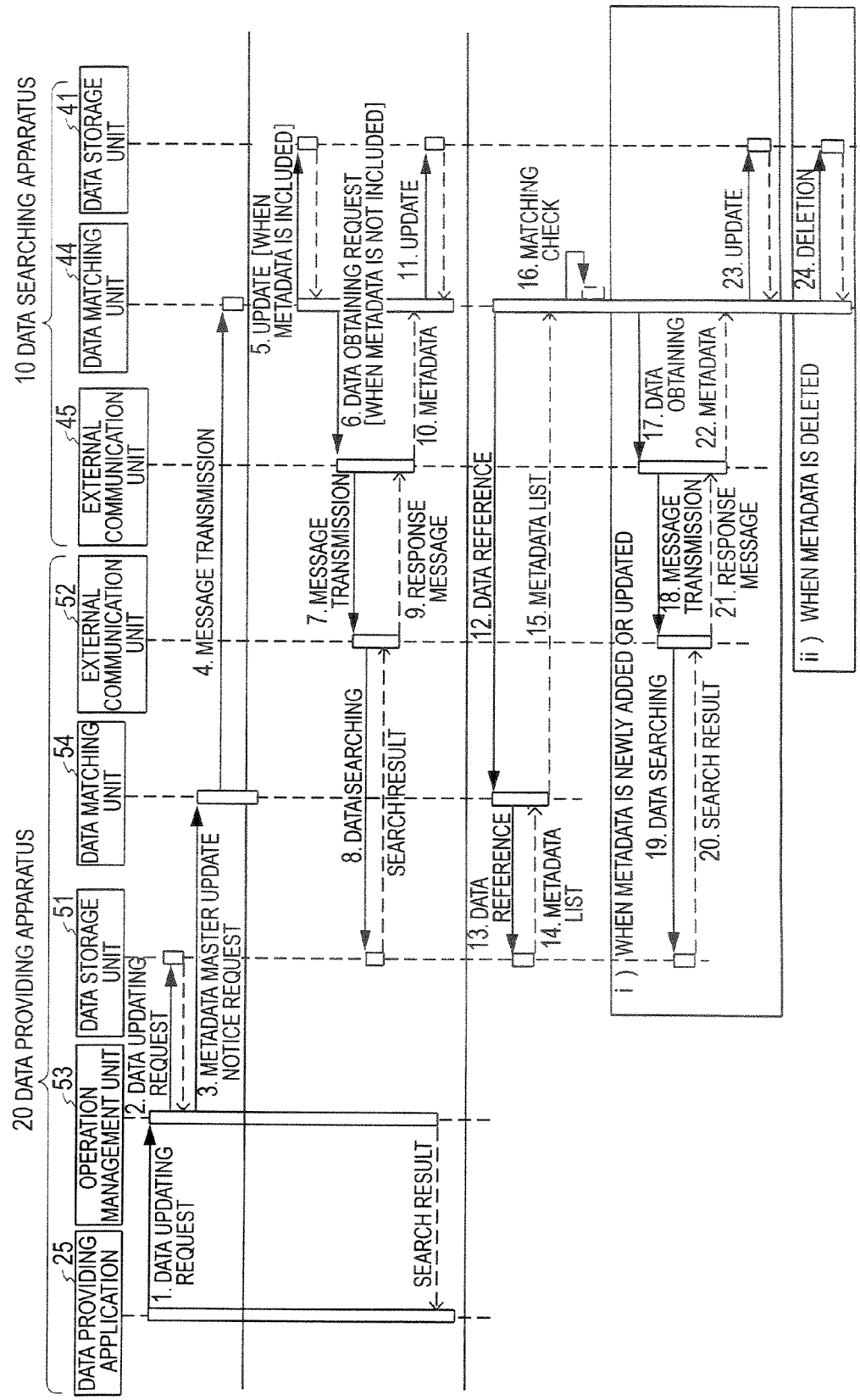
FIG. 5 is a sequence diagram showing the flow of synchronization processing of metadata in the data searching system of FIG. 4.

FIG. 5 is a sequence diagram showing the flow of synchronization processing of metadata in the data searching system 110 of this embodiment.

1. (flow #1 in FIG. 5) A metadata updating request for the metadata master is given to the operation management unit 53 of the data providing apparatus 20 from the data providing application 25.

2. The operation management unit 53 updates the metadata master in the data storage unit 51 by the metadata updating request.

3. When the operation management unit 53 judges that updating of the metadata master occurred, it instructs the data matching unit 54 to transmit a metadata master update notice (metadata MUN) to the data searching apparatus 10.

To this metadata master update notice (metadata MUN), it is possible to add metadata after being updated or an identifier of updated metadata.

4. The data matching unit 54 creates the metadata master update notice message (metadata MUN) and transmits the message to the data matching unit 44 of the data searching apparatus 10.

5. When the metadata master update notice message (metadata MUN) includes metadata after being updated, the data matching unit 44 updates the existing metadata in the data storage unit 41 with the metadata after being updated.

6. When the metadata master update notice message (metadata MUN) does not include the updated metadata, in other words, when only the identifier of the updated metadata is included in the metadata master update notice (metadata MUN), the data matching unit 44 instructs the external communication unit 45 to request obtaining of metadata.

7. The external communication unit 45 generates a metadata obtaining request message (metadata ORM) including a metadata identifier according to the instruction from the data matching unit 44, and transmits the message to the external communication unit 52 of the data providing apparatus 20 via the transmission medium 30.

8. The external communication unit 52 of the data providing apparatus 20 analyzes the data obtaining request message (metadata ORM) received via the transmission medium 30, and searches relevant metadata from the data storage unit 51 based on the metadata identifier included in this data obtaining request message (metadata ORM).

9. When the external communication unit 52 of the data providing apparatus 20 obtains a search result of metadata, it generates a response message including the metadata and transmits the response message to the data searching apparatus 10 via the transmission medium 30.

10. The external communication unit 45 of the data searching apparatus 10 obtains the metadata included in the received response message and passes the metadata to the data matching unit 44.

11. The data matching unit 44 updates the existing metadata in the data storage unit 41 with the metadata obtained from the data providing apparatus 20.

12. To confirm matching of the metadata the data matching unit 44 of the data searching apparatus 10 receives a data reference request irregularly, for example at arbitrary timing specified by the administrator of the data searching apparatus 10, and requests a data reference to the data matching unit 54 of the data providing apparatus 20.

13. 14. The data matching unit 54 of the data providing apparatus 20 performs a data reference from the data storage unit 51 and obtains a metadata list.

15. The data matching unit 54 of the data providing apparatus 20 generates a response message including the metadata list and transmits the response message to the data searching apparatus 10 via the transmission medium 30.

16. The data matching unit 44 of the data searching apparatus 10 obtains the metadata list from the received response message, and judges matching with the metadata stored in the data storage unit 41 for each metadata.

This judgment of matching compares for example contents or versions of metadata having the same identifier with each other, and if contents or versions are different, it is judged that the metadata owned by the data providing apparatus 20 are updated data.

Further, metadata with a new identifier is judged to be newly added metadata.

Moreover, metadata existing in the data storage unit 41 but with an identifier that is not on the metadata list obtained from the data providing apparatus 20 is judged to be metadata deleted from the metadata master.

17. As a result of judgment of the matching, if it is judged that the metadata in the data providing apparatus 20 is newly added or updated, the data searching unit 42 of the data searching apparatus 10 instructs the external communication unit 45 to obtain the newly added or updated metadata from the data providing apparatus 20.

18. The external communication unit 45 of the data searching apparatus 10 generates a metadata obtaining request message including a metadata identifier according to the instruction from the data matching unit 44 and transmits the message to the external communication unit 52 of the data providing apparatus 20 via the transmission medium 30.

19. The external communication unit 52 of the data providing apparatus 20 analyzes the data obtaining request message (metadata ORM) received via the transmission medium 30, and searches relevant metadata from the data storage unit 51 based on the metadata identifier included in this data obtaining request message (metadata ORM).

20. 21. When the external communication unit 52 of the data providing apparatus 20 obtains a search result of metadata, it generates a response message including the metadata and transmits the response message to the data searching apparatus 10 via the transmission medium 30.

22. The external communication unit 45 of the data searching apparatus 10 obtains the metadata from the received response message and passes the metadata to the data matching unit 44.

23. When the metadata is newly added or updated, the data matching unit 44 updates the existing metadata in the data storage unit 41 with the metadata obtained from the data providing apparatus 20.

24. As a result of the judgment of matching, if it is judged that the metadata is deleted from the data providing apparatus 20, the data searching unit 42 deletes the relevant metadata from the data storage unit 41.

As described above, according to the data searching system 110 of this embodiment, with updating of the metadata master as a trigger, the update contents of the metadata master can be reflected on the metadata in the data searching apparatus 10.

Thus, updating of the metadata master can be reflected on the metadata in the data searching apparatus 10 without omission.

Further, at arbitrary timing specified on the data searching apparatus 10 side, updated data in the metadata master can be detected without omission and reflected on the metadata in the data searching apparatus 10.

Note that the synchronization processing of metadata in this embodiment can be used in combination with the synchronization processing triggered by searching of data of the first embodiment.

Third Embodiment

Next, a third embodiment of the present invention is explained.

Figure 6:
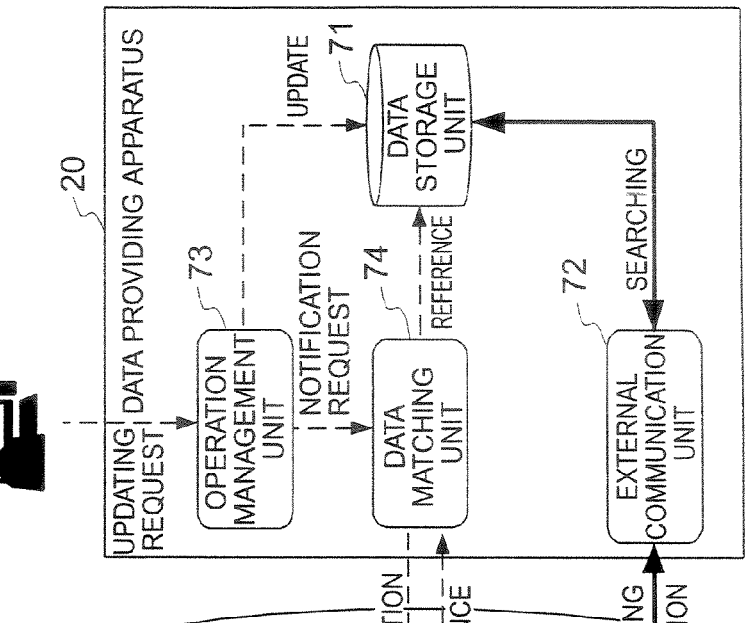
FIG. 6 is a view showing an overall configuration of a data searching system according to a third embodiment of the present invention.

FIG. 6 is a view showing an overall configuration of a data searching system according to the third embodiment of the present invention.

The physical structure of the data searching system 120 of this embodiment is the same as in FIG. 1.

Specifically, the data searching system 120 of this embodiment is constituted of a data searching apparatus 10 and one or more data providing apparatuses 20.

The data searching apparatus 10 and the one or more data providing apparatuses 20 are connected with each other via a transmission medium 30 such as the internet.

The data searching apparatus 10 has a data storage unit 61, a data searching unit 62, a data collection unit 63, a data matching unit 64, and an external communication unit 65.

The data storage unit 61 is a means for storing a copy of metadata master at a certain time owned by the data providing apparatus 20.

According to a searching request including a search condition specified by a data searching application 16, the data searching unit 62 obtains metadata that satisfies the search condition from the data storage unit 61.

The data searching unit 62 instructs the external communication unit 65 based on the obtained metadata to request searching of data to the data providing apparatus 20.

Further, this data searching unit 62 may be one having the function of the data searching unit 12 of the first embodiment.

The data collection unit 63 instructs collection of metadata master to the external communication unit 65 in order to collect a copy of the metadata master periodically.

The data collection unit 63 obtains the copied metadata of the metadata master collected from the data providing apparatus 20 by the external communication unit 65 by this instruction, and judges matching with the metadata in the data storage unit 61.

Further, the data collection unit 63 transmits a data reference request of the data providing apparatus 20 to the data matching unit 64 when non-matching is judged in the above-described judgment of matching.

The data collection unit 63 verifies a metadata list as a data reference result received from the data providing apparatus 20 in response to the data reference request with metadata in the data storage unit 61 and judges matching.

By this judgment of matching, if it is judged that the metadata in the data providing apparatus 20 is newly added or updated, the data collection unit 63 instructs the external communication unit 65 to obtain the newly added or updated metadata from the data providing apparatus 20.

By this instruction, the existing metadata in the data storage unit 61 is updated with the metadata obtained from the data providing apparatus 20 by the external communication unit 65.

Upon reception of the data reference request from the data collection unit 63, the data matching unit 64 requests a data reference to the data providing apparatus 20.

The data matching unit 64 responds to the data collection unit 63 a metadata list as a data reference result received from the data providing apparatus 20 in response to this data reference request.

According to the request from the data collection unit 63, the external communication unit 65 transmits a metadata collection request message (metadata CRM) for the data providing apparatus 20 to the data providing apparatus 20 via the transmission medium 30.

The external communication unit 65 returns to the data collection unit 63 a response message including a metadata collection result and so forth received from the data providing apparatus 20 in response to the metadata collection request message (metadata CRM).

The data providing apparatus 20 has a data storage unit 71, an external communication unit 72, an operation management unit 73, and a data matching unit 74.

The data storage unit 71 is a means for storing actual data and metadata (metadata master) related to the actual data.

The external communication unit 72 receives a metadata collection request (metadata CRM) from the data searching apparatus 10 via the transmission medium 30.

Upon reception of the metadata collection request (metadata CRM), the external communication 72 generates a response message including copied metadata of the metadata master stored in the data storage unit 71 and transmits the response message to the data searching apparatus 10 via the transmission medium 30.

The operation management unit 73 updates at any time the actual data and the metadata (metadata master) in the data storage unit 71 upon reception of a request of updating such as newly adding, updating (version up), deleting or the like of metadata from a data providing application 25.

Further, the operation management unit 73 instructs the data matching unit 74 to transmit a metadata master update notice (metadata MUN for short) to the data searching apparatus 10 each time updating of the metadata master occurs.

According to the instruction from the operation management unit 73, the data matching unit 74 transmits the metadata master update notice (metadata MUN) to the data searching apparatus 10 via the transmission medium 30.

Further, upon reception of the data reference request from the data matching unit 64 of the data searching apparatus 10, the data matching unit 74 performs a data reference to the data storage unit 71, extracts relevant metadata, and responds (transmits) a metadata list to the data matching unit 64 of the data searching apparatus 10.

Figure 7:
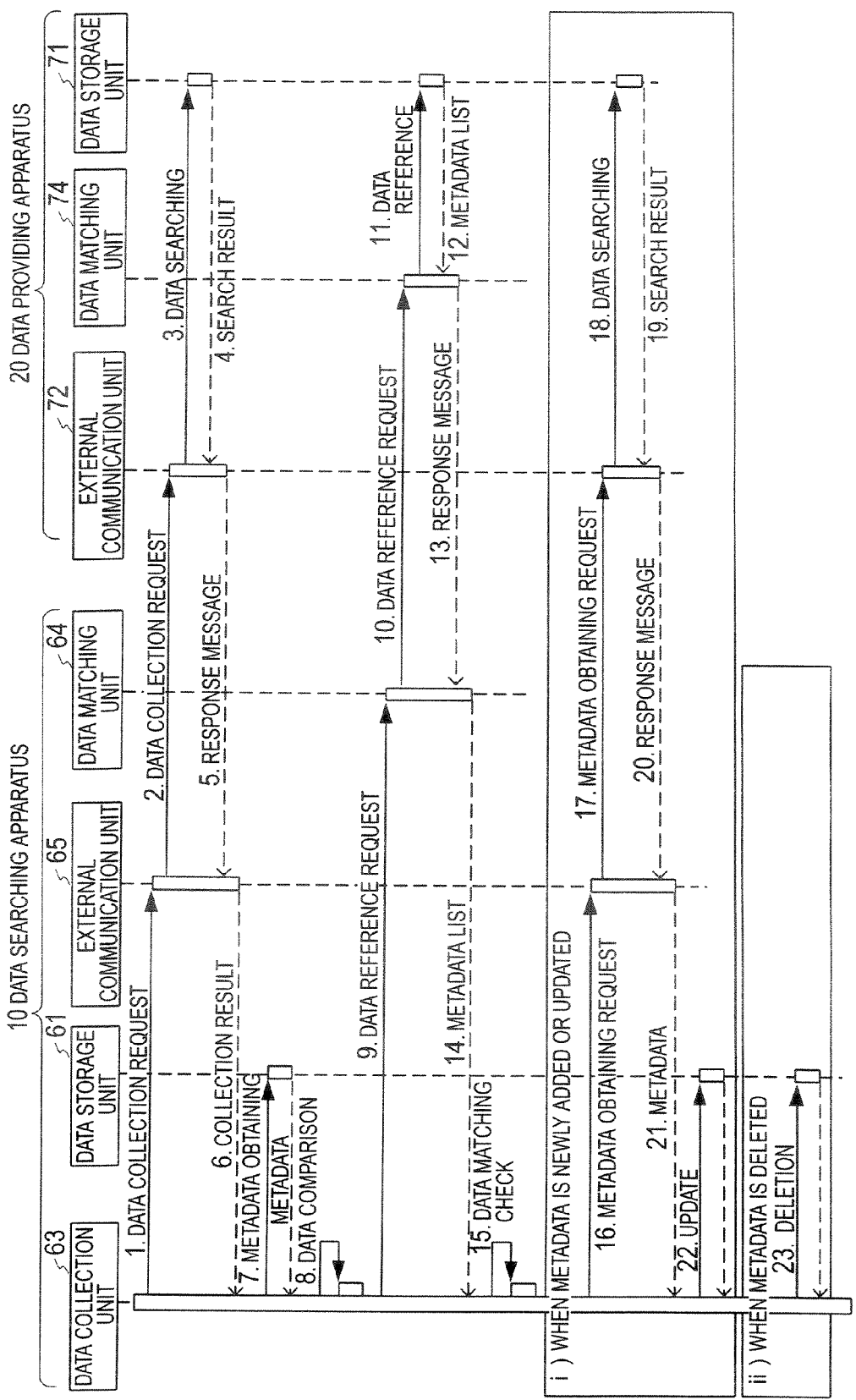
FIG. 7 is a sequence diagram showing the flow of synchronization processing of metadata in the data searching system of FIG. 6.

Next, the operation of the data searching system 120 of this embodiment is explained FIG. 7 is a sequence diagram showing the flow of synchronization processing of metadata in the data searching system 120 of this embodiment.

1. (flow #1 in FIG. 7) In the data collection unit 63 of the data searching apparatus 10, information (once a week, once a day, once every several hours, and so forth) regarding periodic timing for collecting metadata master and performing synchronization processing of metadata is set in advance.

When the data collection unit 63 judges that a condition of timing to collect the metadata master is satisfied by comparing an output of a timer function that manages the date and time with the setting information, it instructs the external communication unit 65 to collect metadata master.

2. The external communication unit 65 of the data searching apparatus 10 generates a metadata master collection request message (metadata MCRM for short) according to this instruction and transmits the message to the data providing apparatus 20 via the transmission medium 30.

3.-5. Upon reception of the metadata master collection request message (metadata MCRM), the external communication unit 72 of the data providing apparatus 20 reads the metadata master from the data storage unit 71, generates a response message including copied metadata of the metadata master, and transmits the message to the data searching apparatus 10 via the transmission medium 30.

6. Upon reception of the response message, the external communication unit 65 of the data searching apparatus 10 passes the copied metadata of the metadata master included in the received response message to the data collection unit 63.

7. 8. The data collection unit 63 obtains the metadata from the data storage unit 61, and compares this metadata collected from the data storage unit 61 with the metadata collected from the data providing apparatus 20 in processing of 4. to judge matching of the both.

9. When judged that each other differ as a result of this judgment, i.e. When non-matching is judged by the judgment of matching, the data collection unit 63 requests a data reference in the data providing apparatus 20 to the data matching unit 64.

10. The data matching unit 64 requests the data reference to the data matching unit 74 of the data providing apparatus 20 via the transmission medium 30.

11.-13. The data matching unit 74 of the data providing apparatus 20 performs the data reference to the data storage unit 71, extracts relevant metadata, and responds a response message including a metadata list to the data matching unit 64 of the data searching apparatus 10 via the transmission medium 30.

14. The data matching unit 64 of the data searching apparatus 10 obtains the metadata list included in the received response message and returns the metadata list to the data collection unit 63.

15. The data collection unit 63 judges matching of the obtained metadata list with the metadata in the data storage unit 61 for each metadata.

This judgment of matching compares for example contents or versions of metadata with each other having the same identifier, and if contents or versions are different, it is judged that the metadata owned by the data providing apparatus 20 are updated data.

Further, metadata with a new identifier is judged to be newly added metadata.

Moreover, metadata existing in the data storage unit 61 but not on the metadata list obtained from the data providing apparatus 20 is judged to be metadata deleted from the metadata master.

16. As a result of judgment of the matching, if the metadata in the data providing apparatus 20 is judged to be newly added or updated, the data collection unit 63 of the data searching apparatus 10 instructs the external communication unit 65 to obtain the newly added or updated metadata from the data providing apparatus 20.

17. The external communication unit 65 of the data searching apparatus 10 generates a metadata obtaining request message (metadata ORM) including a metadata identifier according to the instruction from the data matching unit 64 and transmits the message to the external communication unit 72 of the data providing apparatus 20 via the transmission medium 30.

18. The external communication unit 72 of the data providing apparatus 20 analyzes the data obtaining request message (metadata ORM) received via the transmission medium 30, and searches relevant metadata from the data storage unit 71 based on the metadata identifier included in this data obtaining request message (metadata ORM).

19. 20. When the external communication unit 72 of the data providing apparatus 20 obtains a search result, it generates a response message including the search result and transmits the response message to the data searching apparatus 10 via the transmission medium 30.

21. The external communication unit 65 of the data searching apparatus 10 obtains the metadata as the search result from the received response message and passes the metadata to the data collection unit 63.

22 When the metadata is newly added or updated, the data collection unit 63 updates the existing metadata in the data storage unit 61 with the metadata obtained from the data providing apparatus 20.

23. As a result of the judgment of matching, if it is judged that the metadata is deleted from the data providing apparatus 20, the data collection unit 63 deletes the relevant metadata from the data storage unit 61.

As described above, according to the data searching system 120 of this embodiment, at periodic timing specified on the data searching apparatus 10 side, update contents of the metadata master owned by the data providing apparatus 20 can be judged without omission to reflect them on the metadata in the data searching apparatus 10.

Note that the synchronization processing of metadata in this embodiment can be used in combination with the synchronization processing triggered by searching of data of the first embodiment.

Other Embodiments

The present invention is not limited to the several embodiments explained herein by means of illustration and can be extended and modified, and any extension and modification which come within the range of appended claims are all included in the technical scope of the present invention.

What is claimed is:

1. A data searching system comprising a data providing apparatus having a first data storage unit which stores actual data as a searching target and metadata related to the actual data, performing searching of data from said first data storage unit according to a data searching request, and providing a data search result to a requester, and a data searching apparatus, wherein said data searching apparatus comprises:
a second data storage unit which stores a copied metadata copied from the metadata stored in said first data storage unit;
a data searching unit which searches the copied metadata from said second data storage unit based on a given search condition, and transmits the data searching request to said data providing apparatus based on the searched copied metadata; and
a data matching unit which compares a time of updating of the actual data or the metadata included in the data search result with the copied metadata to judge matching of the both, and when non-matching is judged, judges that the metadata owned by the data providing apparatus is updated, and updates the copied metadata in said second data storage unit with the data search result provided from said data providing apparatus.

2. The data searching system as set forth in claim 1,
wherein said data providing apparatus comprises:
a notification unit which transmits an update notice to said data searching apparatus as triggered by updating of the metadata in said first data storage unit; and
a providing unit which provides the updated metadata from said first data storage unit based on request from said data searching apparatus, and
wherein said data searching apparatus comprises:
a requesting unit which transmits, upon reception of the update notice from said data providing apparatus, an obtaining request of the updated metadata in said first data storage unit to said data providing apparatus; and
an updating unit which updates the copied metadata in said second data storage unit with the updated metadata provided from said data providing apparatus by the obtaining request.

3. The data searching system as set forth in claim 1,
wherein said data searching apparatus requests a data reference to said data providing apparatus, judges matching of a metadata list as a response to the data reference request with the copied metadata in said second data storage unit, requests metadata judged to be non-matching to said data providing apparatus, and updates the copied metadata in said second data storage unit with the metadata obtained from said data providing apparatus.

4. The data searching system as set forth in claim 1, wherein said data searching apparatus requests a data reference to said data providing apparatus, judges matching of a metadata list as a response to the data reference request with the copied metadata in said second data storage unit, and deletes from said second data storage unit metadata deleted in said data providing apparatus.

5. The data searching system as set forth in claim 1, wherein said data searching apparatus requests the metadata stored in said first data storage unit to said data providing apparatus at predetermined periodic timing, judges matching of the metadata periodically collected from said data providing apparatus with the copied metadata stored in said second data storage unit, requests a data reference to said data providing apparatus when non-matching is judged, judges matching of a metadata list as a response to the data reference request with the copied metadata in said second data storage unit, requests metadata judged to be non-matching to said data providing apparatus, and updates the copied metadata in said second data storage unit with the metadata obtained from said data providing apparatus by the request.

6. The data searching system as set forth in claim 1, wherein said data searching apparatus requests the metadata stored in said first data storage unit to said data providing apparatus at predetermined periodic timing, judges matching of the metadata periodically collected from said data providing apparatus with the copied metadata stored in said second data storage unit, requests a data reference to said data providing apparatus when non-matching is judged, judges matching of a metadata list as a response to the data reference request with the copied metadata in said second data storage unit, and deletes from said second data storage unit metadata deleted in said data providing apparatus.

7. A method of synchronizing metadata by a data searching system which comprises a data providing apparatus having a first data storage unit which stores actual data as a searching target and metadata related to the actual data, performing searching of data from the first data storage unit according to a data searching request, and providing a data search result to a requester, and a data searching apparatus having a second data storage unit which stores a copied metadata of the metadata stored in the first data storage unit, the method comprising:

searching, by the data searching apparatus, the copied metadata from the second data storage unit based on a given search condition, and transmitting a data searching request to the data providing apparatus based on the searched copied metadata; and comparing, by the data searching apparatus, a time of updating of the actual data or the metadata included in the data search result with the copied metadata to judge matching of the both, and when non-matching is judged, judging that the metadata owned by the data providing apparatus is updated, and updating the copied metadata in the second data storage unit with the data search result provided from the data providing apparatus.

8. The method of synchronizing metadata as set forth in claim 7, further comprising:

transmitting, by the data providing apparatus, an update notice to the data searching apparatus as triggered by updating of the metadata in the first data storage unit;

transmitting, by the data searching apparatus, upon reception of the update notice from the data providing apparatus, an obtaining request of the updated metadata to the data providing apparatus;

providing, by the data providing apparatus, the updated metadata from the first data storage unit based on request from the data searching apparatus; and updating, by the data searching apparatus, the copied metadata in the second data storage unit with the updated metadata provided from the data providing apparatus.

9. The method of synchronizing metadata as set forth in claim 7, further comprising:

requesting, by the data searching apparatus, a data reference to the data providing apparatus;

judging, by the data searching apparatus, matching of a metadata list as a response to the data reference request with the copied metadata in the second data storage unit, and requesting metadata judged to be non-matching to the data providing apparatus; and updating, by the data searching apparatus, the copied metadata in the second data storage unit with the metadata obtained from the data providing apparatus.

10. The method of synchronizing metadata as set forth in claim 7, further comprising:

requesting, by the data searching apparatus, a data reference to the data providing apparatus; and judging, by the data searching apparatus, matching of a metadata list as a response to the data reference request with the copied metadata in the second data storage unit and deleting from the second data storage unit metadata deleted in the data providing apparatus.

11. The method of synchronizing metadata as set forth in claim 7, further comprising:

requesting, by the data searching apparatus, the metadata stored in the first data storage unit to the data providing apparatus at predetermined periodic timing;

judging, by the data searching apparatus, matching of the metadata periodically collected from the data providing apparatus with the copied metadata stored in the second data storage unit and requesting a data reference to the data providing apparatus when non-matching is judged;

judging, by the data searching apparatus, matching of a metadata list as a response to the data reference request with the copied metadata in the second data storage unit and requesting metadata judged to be non-matching to the data providing apparatus; and updating, by the data searching apparatus, the copied metadata in the second data storage unit with the metadata obtained from the data providing apparatus by the request.

12. The method of synchronizing metadata as set forth in claim 7, further comprising:

requesting, by the data searching apparatus, collection of the metadata stored in the first data storage unit to the data providing apparatus at predetermined periodic timing;

judging, by the data searching apparatus, matching of the metadata periodically collected from the data providing apparatus with the copied metadata stored in the second data storage unit and requesting a data reference to the data providing apparatus when non-matching is judged; and judging, by the data searching apparatus, matching of a metadata list as a response to the data reference request with the copied metadata in the second data storage unit and deleting from the second data storage unit metadata deleted in the data providing apparatus.

13. A data searching apparatus connectable to a data providing apparatus having a first data storage unit which stores actual data as a searching target and metadata related to the actual data, performing searching of data from the first data storage unit according to a data searching request, and providing a data search result to a requester, the data searching apparatus comprising:

a second data storage unit which stores a copied metadata copied from the metadata stored in the first data storage unit;

a data searching unit which searches the copied metadata from said second data storage unit based on a given search condition, and transmits the data searching request to the data providing apparatus based on the searched copied metadata; and a data matching unit which compares a time of updating of the actual data or the metadata included in the data search result with the copied metadata to judge matching of the both, and when non-matching is judged, judges that the metadata owned by the data providing apparatus is updated, and updates the copied metadata in said second data storage unit with the data search result provided from the data providing apparatus.

\* \* \* \* \*